(12) United States Patent
King et al.

(10) Patent No.: US 6,271,765 B1
(45) Date of Patent: *Aug. 7, 2001

(54) PASSIVE GARAGE DOOR OPENER

(75) Inventors: Joseph D. King, Ann Arbor; Ozer M. N. Teitelbaum, Farmington, both of MI (US)

(73) Assignee: Lear Automotive Dearborn, Inc., Southfield, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/088,933

(22) Filed: Jun. 2, 1998

(51) Int. Cl.⁷ .................................................. G08C 19/00
(52) U.S. Cl. ............................ 340/825.69; 340/825.49; 340/436; 340/10.1; 340/903; 342/42; 342/44; 701/118
(58) Field of Search .................. 340/825.69, 825.49, 340/825.31, 10.1, 436, 903, 988; 342/76, 359, 42, 44, 357.07; 701/117, 301, 118, 213, 214

(56) References Cited

U.S. PATENT DOCUMENTS

| | | | |
|---|---|---|---|
| 4,827,420 | 5/1989 | Kimura . | |
| 5,127,486 | * 7/1992 | Yardley et al. | 340/941 |
| 5,247,440 | 9/1993 | Capurka et al. | 701/49 |
| 5,369,591 | * 11/1994 | Broxmeyer | 701/301 |
| 5,450,329 | * 9/1995 | Tanner | 701/213 |
| 5,485,520 | * 1/1996 | Chaum et al. | 342/42 |
| 5,490,079 | * 2/1996 | Sharpe et al. | 701/213 |
| 5,521,604 | * 5/1996 | Yamashita | 342/359 |
| 5,583,514 | * 12/1996 | Fulop | 342/359 |
| 5,867,122 | * 2/1999 | Zahm et al. | 342/357.07 |
| 5,955,973 | * 9/1999 | Anderson | 340/988 |
| 5,959,577 | * 9/1999 | Fan et al. | 342/357.13 |
| 5,990,828 | 6/1998 | King . | |

FOREIGN PATENT DOCUMENTS

| | | |
|---|---|---|
| 9-136660 | 9/1997 | (JP) . |
| WO 92/16907 | 10/1992 | (WO) . |

* cited by examiner

Primary Examiner—Brian Zimmerman
Assistant Examiner—Yves Dalencourt
(74) Attorney, Agent, or Firm—Niro, Scavone, Haller & Niro

(57) ABSTRACT

A passive garage door opener system includes a sensor for determining the position of the vehicle relative to the receiver. When the vehicle is within a predetermined area near the receiver, the transmitter sends the signal to open the garage door. Other conditions of the vehicle, such as speed and heading, may also be monitored to determine when and whether to send the signal.

12 Claims, 1 Drawing Sheet

PASSIVE GARAGE DOOR OPENER

BACKGROUND OF THE INVENTION

The present inventions relates generally to a wireless transmitter for a vehicle and more particularly to a passive garage door opener for use in a vehicle.

The majority of new homes built are constructed with garage door openers with remote controllers using RF wireless technology. Further, many existing homes have been upgraded with garage door openers also using RF wireless technology for accomplishing the remote function. A current trend in the automotive market is to provide new vehicles with factory-installed universal garage door opener transmitters. Several garage door opener transmitters have been designed to produce a passive garage door opener system that does not require the user to manually actuate the transmitter.

SUMMARY OF THE INVENTION

The present invention provides a passive garage door opener system in which the transmitter sends a signal to the garage door opener receiver based upon the position of the transmitter. Preferably, the garage door is in a position known relative to earth and the position of the transmitter (vehicle) is determined relative to earth by a sensor. From this, the relative distance and position of the vehicle relative to the garage door can be determined. The transmitter then sends a signal to the receiver based upon the distance and/or position of the vehicle relative to the garage door.

Preferably, the sensor comprises a navigation system or its components, such as a GPS receiver, dead reckoning system, etc. Preferably, other factors, such as vehicle speed and heading, are also monitored to determine whether and when to send the signal from the transmitter. With vehicle heading and speed information, the garage door opener system can also determine whether the door should be opened (when the vehicle is heading toward the door) or closed (when the vehicle is heading away from the door).

DETAILED DESCRIPTION OF A PREFERRED EMBODIMENT

Figure 1:
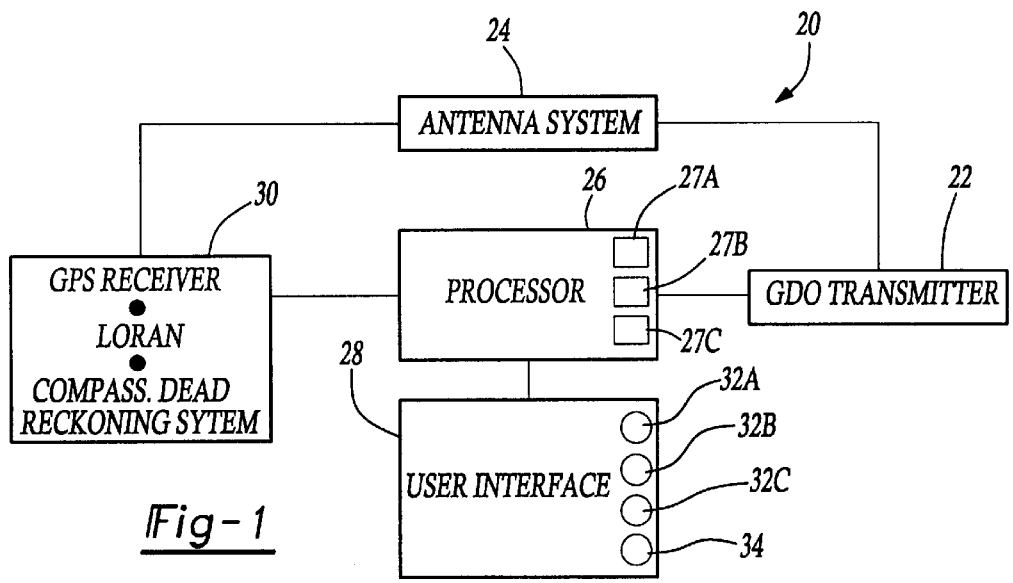
FIG. 1 is a schematic of the door opening transmitter system of the present invention.

A door opening transmitter system 20 according to the present invention is shown schematically in FIG. 1. The transmitter system 20 includes a door opener transmitter 22, such as an RF, infrared, microwave, or other known transmitter. In the preferred embodiment, the transmitter 22 selectively generates any one of a plurality codes which may be encrypted or rolled according to known techniques. The transmitter 22 transmits the signal via an antenna system 24, which is appropriate to the technology of the transmitter 22.

A processor 26 receives inputs from a user interface 28 and a position and velocity sensor 30 and selectively causes the transmitter 22 to generate each of the three signals. The sensor 30 may comprise a vehicle navigation system or one or more components of a vehicle navigation system, such as a GPS receiver, compass, dead reckoning system, vehicle speed sensors, map matching algorithms, etc. According to known techniques, and utilizing commercially available hardware and software, the sensor 30 determines the position of the transmitter system 20 relative to earth, as well as its velocity, including speed and heading. This information is sent to the processor 26 for analysis, as will be described in more detail below.

The user interface 28 includes a plurality of user input devices 32A–C, 34, such as switches or buttons. Information regarding activation of the user input devices 32A–C, 34 is sent to the processor 26 for analysis as will be described below. The processor 26 includes storage 27A–C, for storing a plurality of locations indicated by the sensor 30 and associated with the user input devices 32A–C, respectively, as will be described below. The processor 26 includes software for performing the functions described herein; however, it is also recognized that these functions could be provided by hardware, such as combination logic, state machines, etc.

Figure 2:
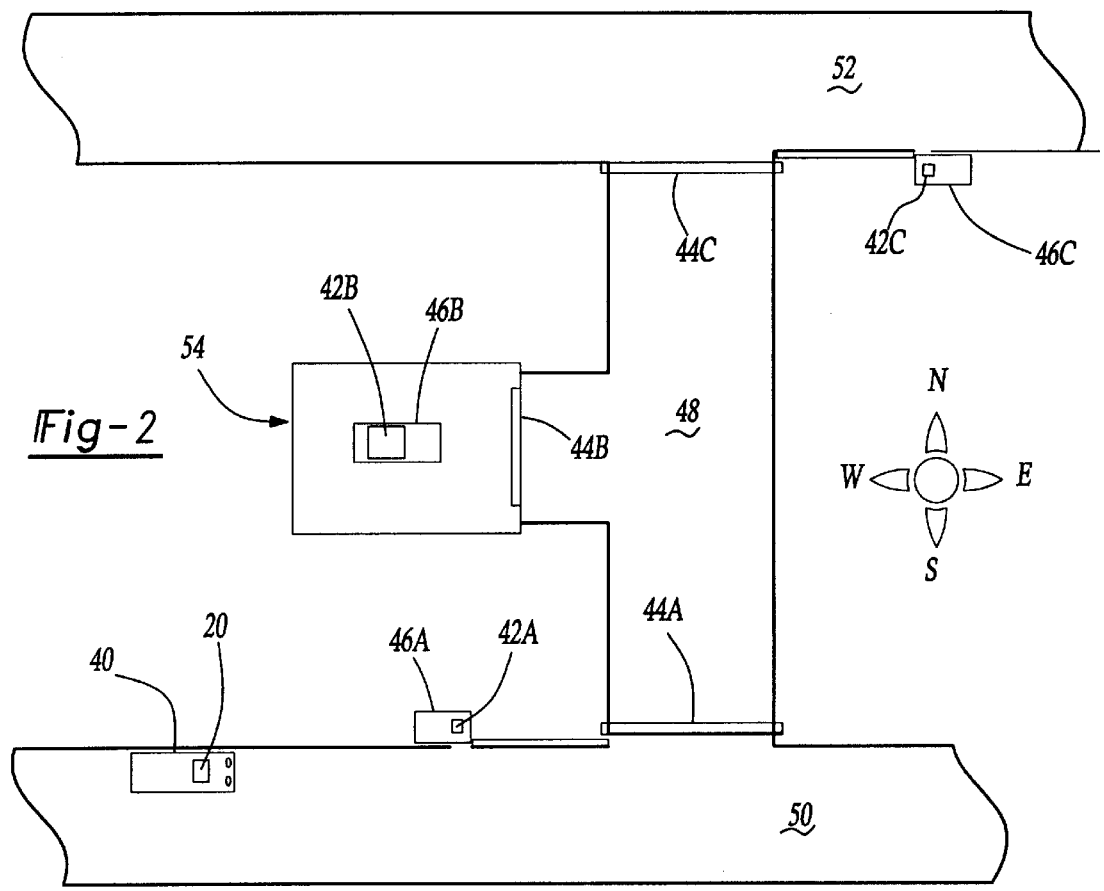
FIG. 2 illustrates a door opening system including the garage door opener transmitter system of FIG. 1.

FIG. 2 illustrates a vehicle 40 in which the transmitter system 20 is installed for operation with a plurality of receivers 42A–C, installed at various locations on an estate, as shown. A first receiver 42A is associated with a first gate 44A, such as a first estate gate, which is selectively opened and closed by a motor 46A as controlled by the receiver 42A. The second receiver 42B is associated with a second gate 44B, such as a garage door, which is opened and closed by a motor 46B as selectively operated by the receiver 42B. The third receiver 42C is associated with a third gate 44C, such as another estate gate which is opened and closed by a motor 46C as selectively operated by the receiver 42C.

As shown in FIG. 2, the first gate 44A selectively permits and restricts access to a driveway 48 from a first street 50. The third gate 44C selectively permits and restricts access to the driveway 48 from a second street 52. The second gate 44B selectively permits and restricts access to a garage 54 adjacent the driveway 48.

In operation, the transmitter system 20 transmits a signal associated with one of the receivers 42A–C, based upon the position, heading and/or speed of the vehicle 40 as determined by the sensor 30 (FIG. 1). Generally, the positions of the gates 44A–C are stored in the storage 27A–C (FIG. 1) of the transmitter system 20 relative to earth. When the transmitter system 20 determines that its position relative to earth is within a predetermined distance (such as one hundred feet) of one of the gates 44A–C, it transmits an appropriate signal to the corresponding receiver 42A–C, respectively.

Preferably, the heading of the vehicle 40 as determined by the sensor 30 is also used to determine whether to transmit the signal and what signal to transmit. For example, if the vehicle 40 is traveling toward one of the gates 44A–C, that gate 44A–C should be opened. If the vehicle 40 is traveling away from one of the gates 44A–C, the gate 44A–C should be closed, even if within the predetermined distance. Vehicle speed could also be used as a condition to opening the second gate 44B; e.g., when the vehicle is in the driveway 48 and the ignition is first turned on, but not moving, the second gate 44B is not opened, even though the vehicle 40 is within the predetermined distance. Further, since the transmitter system 20 would know when it is inside the garage 54, the transmitter system 20 could ensure that the second gate 44B (the garage door) is open if the engine is running.

Since the position of the transmitter 20 and the receivers 42A–C, will be known relative to earth, the relative direction of the receiver 42A–C from the transmitter 20 can also be determined. With this information, the antenna system 24 could be utilized to focus and direct the transmitted signal in the relative direction of the appropriate receiver 42A–C, thus, increasing range and reducing power requirement. This feature is described in more detail in U.S. Pat. No. 5,990,828, filed concurrently herewith, the assignee of which is the assignee of the present invention.

In order to store the locations of the gates 44A–C, the vehicle 40 is first positioned at or adjacent the gate 44A–C. The transmitter system 20 is then placed in learning mode, such as by activating user input device 34 and one of the switches 32A–C, as appropriate (FIG. 1). The location of the transmitter system 20 (and the vehicle 40) at the time the learning mode button 34 is pressed is stored in the storage 27A–C corresponding to the associated gate 44A–C and receiver 42A–C.

The transmitter system 20 and the receivers 42A–C preferably include a system for ensuring that the corresponding gates 44A–C are either closed or open. In other words, when the vehicle 40 is heading towards a gate 44A–C which is already open, the transmitter system 20 and receivers 42A–C should ensure that the gate is not then closed by the transmitter system 20. One way of accomplishing this feature is to provide an additional transmitter (not shown) located on each receiver 42A–C which would transmit to an additional receiver (not shown) on the vehicle 40 information indicating the current position of the associated gate 44A–C. The processor 26 and the transmitter system 20 would receive this information to ensure that the gate 44A–C is in the proper position. Another way of accomplishing this feature is for the transmitter 22 to transmit separate open and close signals for each of the receivers 42A–C. If the processor 26 determines that a gate 42A–C should be open, the transmitter 22 transmits an "open" signal indicating to the receiver 42A–C that its corresponding gate 44A–C should be open. The appropriate receiver 42A–C then evaluates whether its associated gate 44A–C is in the proper position. If it is, the receiver 42A does nothing. If it is not in the proper position, the receiver 42A–C activates the associated motor 46A–C to change the position of the associated gate 44A–C. Many prior systems for accomplishing passive door opening have addressed this function in other ways, many of which could be used in combination with the present invention. Preferably, the user-input devices 32 could also be activated manually to open and close the gates 44A–C.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A wireless transmitter system for a vehicle that optionally travels along a route, there existing at a location of the route a control system for selectively permitting and restricting passage of the vehicle traveling along the route past the location on the route, the control system normally restricting the vehicle from proceeding past the location, said wireless transmitter system comprising:

a transmitter for selectively transmitting a wireless signal, the control system being responsive to receipt of the wireless signal to permit passage of the vehicle past the location; and a sensor for determining a position of said transmitter relative to the location, wherein said transmitter automatically transmits the wireless signal to the control system based upon the position determined by said sensor.

2. The wireless transmitter system of claim 1, wherein the control system is a garage door opener that opens a garage door in response to receipt of the wireless signal.

3. The wireless transmitter system of claim 1, wherein the control system is a gate opener that opens a gate in response to receipt of the wireless signal.

4. The wireless transmitter system of claim 1, wherein said sensor determines the position relative to earth.

5. The wireless transmitter system of claim 4, wherein said sensor includes a GPS receiver.

6. The wireless transmitter system of claim 4, wherein said sensor includes a dead reckoning system.

7. The wireless transmitter system of claim 4, further comprising a memory for storing the location, wherein the location is that of the control system relative to earth and said transmitter sends the wireless signal based upon a comparison of the location stored in said memory and the position determined by said sensor.

8. The wireless transmit system of claim 7, wherein the control system is a garage door opener that opens a garage door in response to receipt of the wireless signal.

9. The wireless transmitter system of claim 7, wherein the control system is a gate opener that opens a gate in response to receipt of the wireless signal.

10. The wireless transmitter system of claim 1, wherein said transmitter automatically transmits the wireless signal further based upon a speed of the vehicle.

11. A wireless transmission method for a vehicle that optionally travels along a route, there existing at a location of the route a control system for selectively permits and restricts passage of the vehicle traveling along the route past a location on the route, the control system normally restricting the vehicle from proceeding past the location, said method comprising the steps of:

selectively transmitting a wireless signal from a transmitter, the control system being responsive to receipt of the wireless signal to permit passage of the vehicle past the location; and determining a position of said transmitter relative to the location, wherein said transmitting step automatically transmits the wireless signal to the control system based upon the position determined in said determining step.

12. The method of claim 11, wherein said transmitting step automatically transmits the wireless signal further based upon a speed of the vehicle.

\* \* \* \* \*